United States Patent [19]
Sandham

[11] Patent Number: 5,362,014
[45] Date of Patent: Nov. 8, 1994

[54] EJECTABLE LIGHTWEIGHT FOAM PROTECTIVE COVERS FOR FIBER OPTIC DATA LINK SYSTEMS

[75] Inventor: Warren A. Sandham, Lilburn, Ga.

[73] Assignee: The United States of America as represented by the Secretary of the Air Force, Washington, D.C.

[21] Appl. No.: 829,993

[22] Filed: Jan. 31, 1992

[51] Int. Cl.⁵ ............................................. F42B 15/10
[52] U.S. Cl. ................................... 244/3.12; 102/378
[58] Field of Search ............... 244/3.12; 102/293, 378; 385/135

[56] References Cited

U.S. PATENT DOCUMENTS

| | | | |
|---|---|---|---|
| 3,069,975 | 12/1962 | Nauchutz et al. | 244/3.12 |
| 4,499,829 | 2/1985 | Jacobson et al. | 102/293 |
| 4,515,082 | 5/1985 | Pizzurro | 102/293 |
| 5,056,406 | 10/1991 | Pinson | 244/3.12 |

Primary Examiner—Daniel T. Pihulic
Attorney, Agent, or Firm—Fredric L. Sinder; Thomas L. Kundert

[57] ABSTRACT

A lightweight, ejectable cover assembly for a fiber optic cable payout system comprises a foam plastic cover, one or more nylon bolts, one or more compression springs, and one or more parachute reefing line cutters for severing on command the nylon bolts to cleanly eject the cover without any debris damaging the optical fiber as it pays out. A disk shaped cover covers an aircraft wing-mounted payout canister and its enclosed spool of optical fiber. An annular shaped cover covers a glide weapon-mounted payout canister and its enclosed spool of optical fiber. A reefing line cutter or cutters severs the nylon bolt or bolts and the compression springs then forcibly eject the cover into the air stream out of the way of the paying out loop of optical fiber.

8 Claims, 3 Drawing Sheets 5,362,014

EJECTABLE LIGHTWEIGHT FOAM PROTECTIVE COVERS FOR FIBER OPTIC DATA LINK SYSTEMS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to ejectable protective covers for fiber optic cable payout systems, and more particularly to ejectable lightweight foam covers for fiber optic cable payout systems for wing-mounted optically-guided glide weapons.

Many wing-mounted weapon systems, so-called smart bombs or glide weapons, are guided to their target from the launching aircraft. A common acronym for such glide weapons is GBU followed by a numerical designation, such as GBU-15 or GBU-27. GBU stands for glide-bomb unit. Glide weapons can be assembled in a variety of custom configurations to meet different requirements. Glide weapons are particularly used to deliver very large payloads precisely on target.

Glide weapons are generally configured either as optically-guided or as laser-guided. Optically-guided glide weapons have a camera in the nose of the glide weapon which sends visual images back to the launching aircraft. The pilot or weapons officer in the aircraft then sends control signals over a radio-frequency ("rf") data link to the glide weapon to guide it to its designated target.

Laser-guided glide weapons have an infrared sensor in the nose of the glide weapon. The pilot or weapons officer in the launching aircraft aims an infrared laser beam at the designated target to illuminate it. The glide weapon sensor senses the reflected laser radiation and guides the glide weapon to the illuminated target.

As indicated, most optically-guided glide weapons send and receive video and control signals by rf data links. Rf data links suffer from a number of disadvantages. Among these disadvantages are that they are subject to interference, jamming and detection.

One solution to the problems with rf data links has been to connect the launching aircraft and a launched weapon to different ends of a single strand of fiber optic cable. A dual spool fiber optic payout system dispenses a continuous length of the optical fiber simultaneously from both the aircraft and from the glide weapon. One spool is mounted inside a rear-opening payout canister mounted under a wing and the other spool is mounted inside the space at the rear of the glide weapon which otherwise would house the rf circuitry. The strand of optical fiber makes a c-shaped loop as it pays out from both canisters and drags behind the forward-moving aircraft and the dropping-away glide weapon. The optical fiber can be several kilometers in length.

Both to provide an aerodynamic shape to the rear of both the payout canister and the glide weapon, and to protect the optical fiber spools, covers are placed over the rear openings of the payout canister and the glide weapon. A reinforced section of fiberoptic cable, called a service loop, extends between the payout canister and the glide weapon and maintains the connection between the two spools while the covers are in place. Just before a glide weapon is launched, the covers must be removed so that the optical fiber can freely unspool.

Earlier attempts at making suitable covers used polyurethane foam discs which were cut free and thrust rearward by a ring-like assembly actuated by explosive driven pistons that forced the ring through the foam in cookie-cutter fashion. A lightweight foam plastic was used because pieces of such foam generally will not damage aircraft structures or aircraft engines. Unfortunately, the lightweight foam discs proved too weak to withstand the base pressure force generated by air flow. At speeds about 300 knots, chunks of foam broke off from the disc. Although the discs could have been made stronger, the cutters would then have been unable to fully penetrate the foam.

Other attempts at making suitable cover assemblies included a frangible glass dome having a bonded nylon mesh backing. A service loop connected the two covers so that when the glide weapon was launched, the service loop pulled off and shattered the glass domes. Unfortunately, in addition to other deficiencies, the cover shards and other debris can damage the delicate glass fibers.

Another attempt at making a suitable foam cover assembly uses a stronger foam cover which is fractured and pulled away by a small drogue parachute ejected by a drogue gun mounted on the side of either of the payout canister and the glide weapon. Also unfortunately, this cover assembly suffered too, in addition to other deficiencies, from the cover shards being able to damage the delicate glass fibers.

Thus it is seen that there is a need for covers for fiber optic fiber payout systems that are strong enough to withstand air flow pressures, yet which can be rapidly removed on command, and which will not on removal create broken fragments capable of damaging aircraft structures and, more importantly, the optical fibers.

It is, therefore, a principal object of the present invention to provide an ejectable, lightweight foam cover assembly for a fiber optic cable payout system that ejects quickly on command and without broken fragments capable of damaging the glass fibers.

It is a feature of the present invention that its covers can be removed for inspection, servicing or other reasons without disturbing the installation or rigging of the cutter mechanism.

It is an advantage of the present invention that it uses readily available low cost components in a simple and straightforward manner to make an inexpensive ejectable cover assembly.

It is another advantage of the present invention that it permits last minute installation of its pyrotechnic cutter mechanism where explosive hazard rules apply.

These and other objects, features and advantages of the present invention will become apparent as the description of certain representative embodiments proceeds.

SUMMARY OF THE INVENTION

The present invention provides an ejectable, lightweight foam cover assembly for a fiber optic payout system that ejects quickly on command and without broken fragments that can damage the glass fiber. The unique discovery of the present invention is that a combination of plastic bolts, which hold a foam plastic cover in place over a fiber optic payout canister, explosive parachute reefing line cutters for severing the plastic bolts on command, and compression springs for resiliently biasing the foam plastic cover away from a payout canister, solves the problems of the prior art and fulfills the objects of the present invention.

Accordingly, the present invention is directed to a cover assembly for an optical fiber dispensing system having a fiber optic payout canister for holding a spool of optical fiber, comprising a plastic foam cover; one or more plastic bolts for bolting the plastic foam cover to the payout canister; one or more compression springs mounted between the plastic foam cover and the inside of the payout canister for resiliently biasing the plastic foam cover away from the payout canister; and, a number equal to the number of plastic bolts of explosively fired means for severing bolts. The plastic foam cover may be frangible. The plastic foam cover may also have a beveled lip for additional stiffness. The plastic foam cover may be a circular disk and the number of plastic bolts may be one. One or more plastic washers may be positioned adjacent to the plastic foam cover. The explosively fired means for severing bolts may comprise an explosive parachute reefing line cutter. The plastic foam cover may also be an annulus and the number of plastic bolts may then be three or more. The plastic foam cover may be made of molded polyurethane and the bolt may be made of nylon.

DESCRIPTION OF THE DRAWINGS

The present invention will be more clearly understood from a reading of the following detailed description in conjunction with the accompanying drawings wherein.

DETAILED DESCRIPTION

Figure 1:
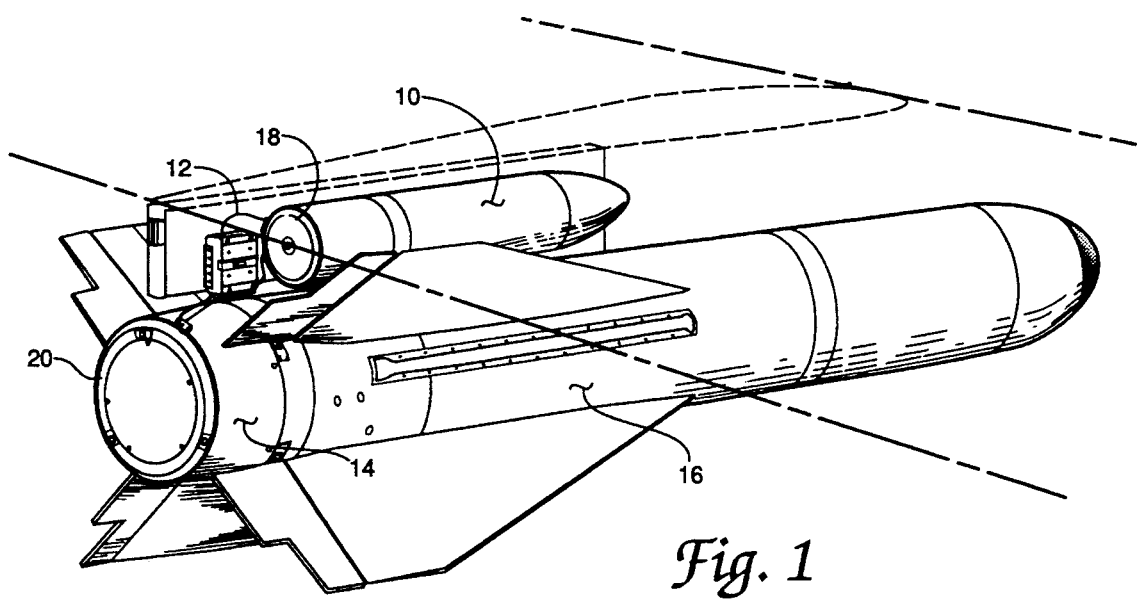
FIG. 1 is a representative perspective view of a fiber optic cable payout system showing a wing-mounted payout canister connected by a length of reinforced optical cable to a weapon-mounted payout canister that is integrated into the rear of a wing-mounted glide weapon.

Referring now to FIG. 1 of the drawings, there is shown a representative perspective view of a fiber optic cable payout system showing a wing-mounted payout canister 10 connected by a length of reinforced optical cable, or service loop, 12 to a weapon-mounted payout canister 14 that is integrated into the rear of a wing-mounted glide weapon 16. Cover 18 and cover 20 cover, respectively, wing-mounted payout canister 10 and weapon-mounted payout canister 14. Cover 18 is a circular disc and cover 20 is an annular ring.

Figure 2:
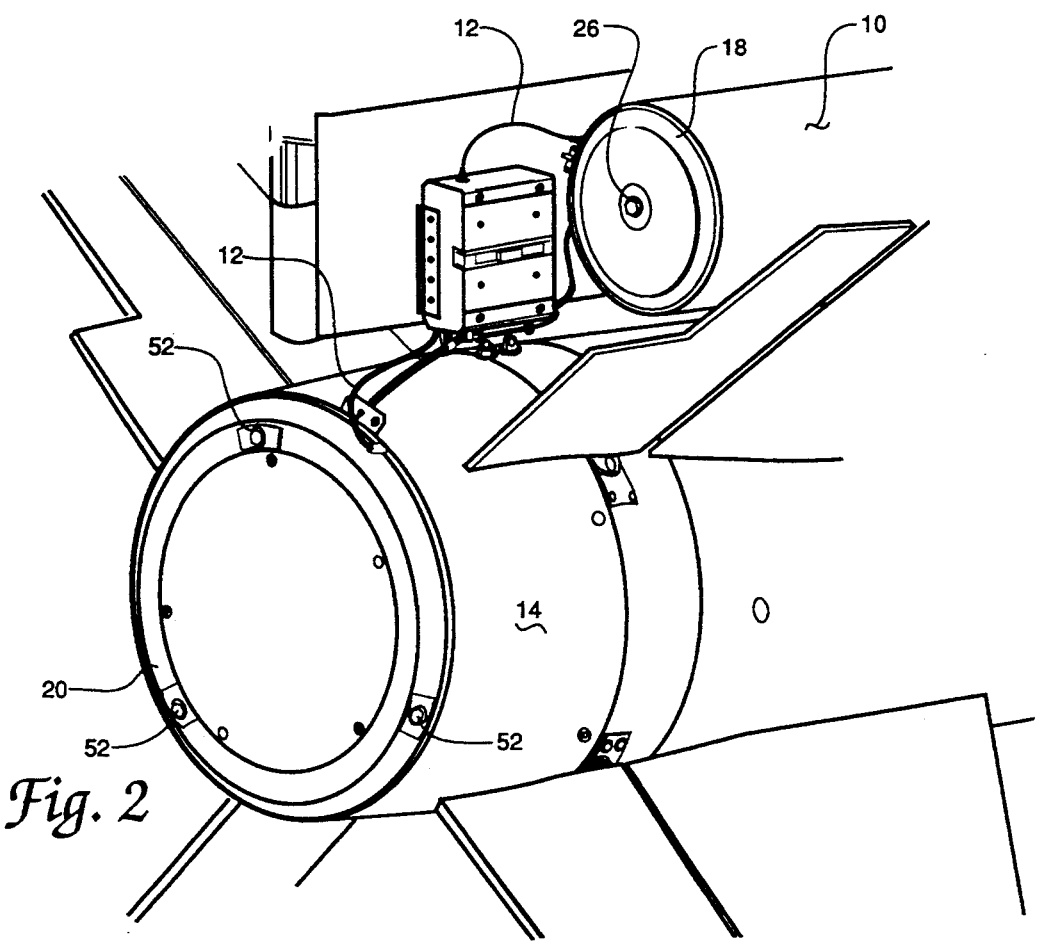
FIG. 2 is a closer representative perspective view of the wing-mounted payout canister and weapon-mounted payout canister of FIG. 1.
Figure 3:
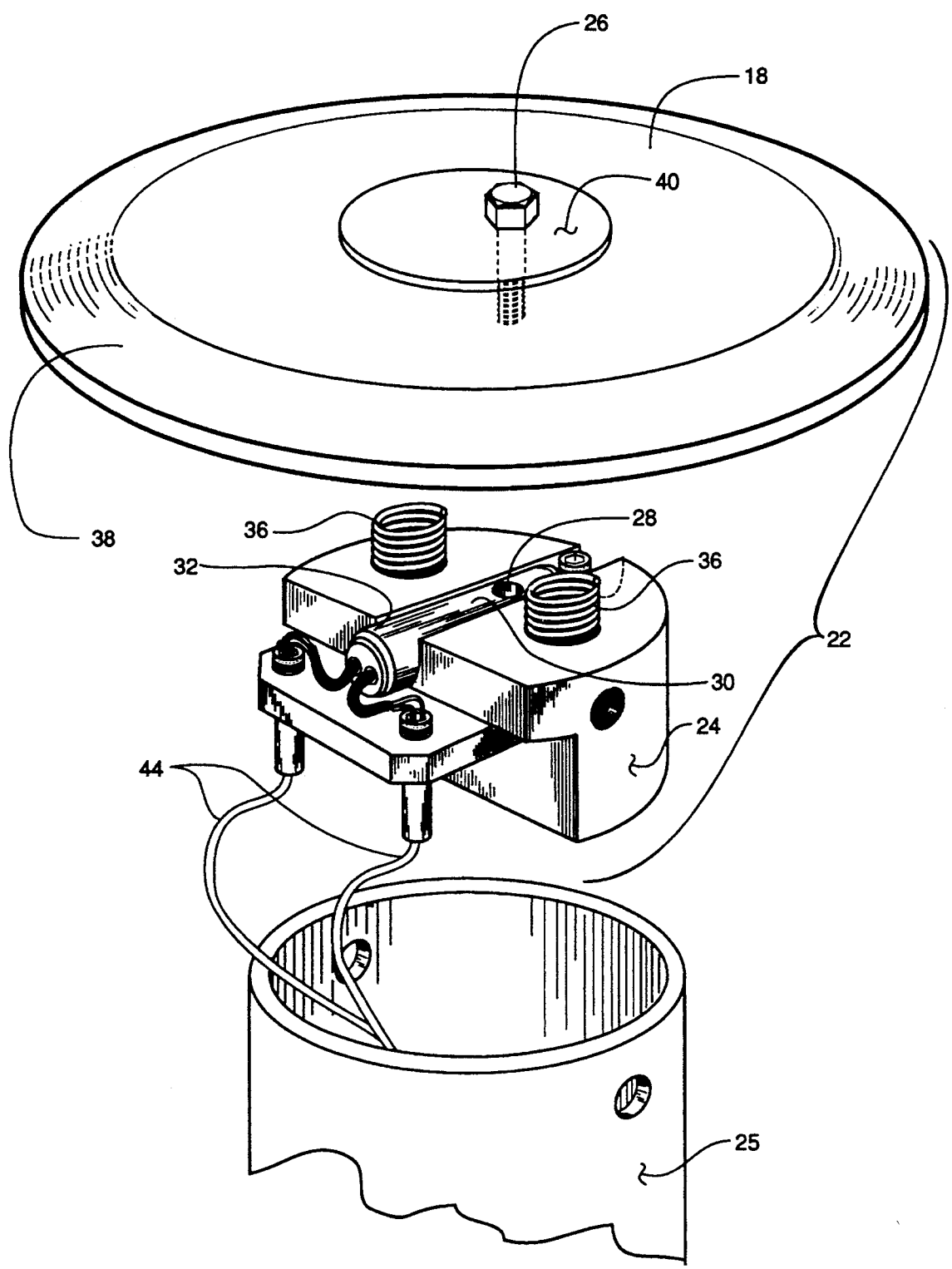
FIG. 3 is an exploded perspective view of a cover assembly according to the teachings of the present invention for a wing or airframe-mounted optical fiber payout canister.

FIG. 2 is a closer representative perspective view of the wing-mounted payout canister 10 and weapon-mounted payout canister 14 of FIG. 1;

FIG. 3 is an exploded perspective view of a cover assembly 22 comprising cover 18 and interior support structure 24. Support structure 24 mounts inside wing-mounted payout canister 10. A spool of optical fiber (not shown in this figure) surrounds support structure 24 and the interior part of payout canister 10 to which support structure 24 attaches. A nylon bolt 26 attaches cover 18 to support structure 24. Nylon bolt 26 passes through an opening 28 normally for passage of a reefing line in a conventional explosive parachute reefing line cutter 30. Reefing line cutter 30 incorporates an explosive squib 32 to force forward a cutter 34 (shown in FIG. 4). A pair of compression springs 36 are mounted in support structure 24 so that they are compressed when cover 18 is in place.

Cover 18 has a beveled edge 38 to increase stiffness. Nylon stiffening washers 40 and 42 are bonded to cover 18 to protect the cover from crushing when bolt 26 is tightened. Stiffening washer 42 is shown in FIG. 4.

In use, wires 44 from reefing line cutter 30 lead to a squib firing circuit inside payout canister 10. Just before glide weapon 16 is launched, the squib firing circuit is initiated to fire reefing line cutter 30. Reefing line cutter 30 severs nylon bolt 26 so that springs 36 push cover 18 away from payout canister 10 with sufficient force to clear the space that will be occupied a moment later by a loop of optical fiber. Prior to ejection of cover 18, a MYLAR strip wraps around the inside of payout canister 10 and is held in place with adhesive foam to hold the service loop in proper position so that the optical fibers will begin to play out cleanly without snags as air stream forces begin to pull on them.

Figure 4:
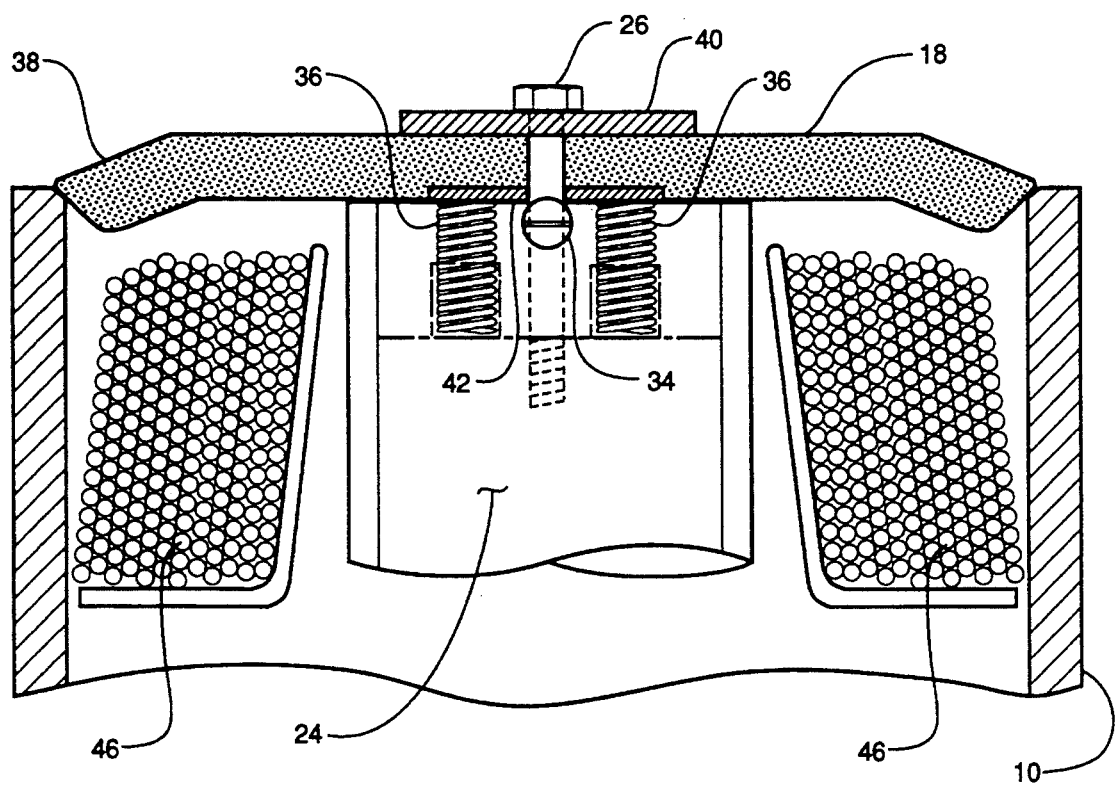
FIG. 4 is a cross-sectional view of the wing-mounted cover assembly of FIG. 3; and, FIG. 5 is a partial cross-sectional view of one side of a weapon-mounted cover assembly according to the teachings of the present invention.

FIG. 4 is a cross-sectional view of wing-mounted cover assembly 22 showing the relationship between support structure 24 and a spool 46 of optical fiber. Bolt 26 is sufficiently tightened to maintain a snug fit and seal against canister 10. This protects the optical fibers from environmental effects prior to release of cover 18. Cutter 34 of reefing line cutter 30 is visible in this view. Cutter 34 is explosively forced against an anvil (not shown) when squib 32 (shown in FIG. 3) is fired and severs bolt 26. Cutter 34, the anvil and the squib are integral parts of reefing line cutter 30.

Figure 5:
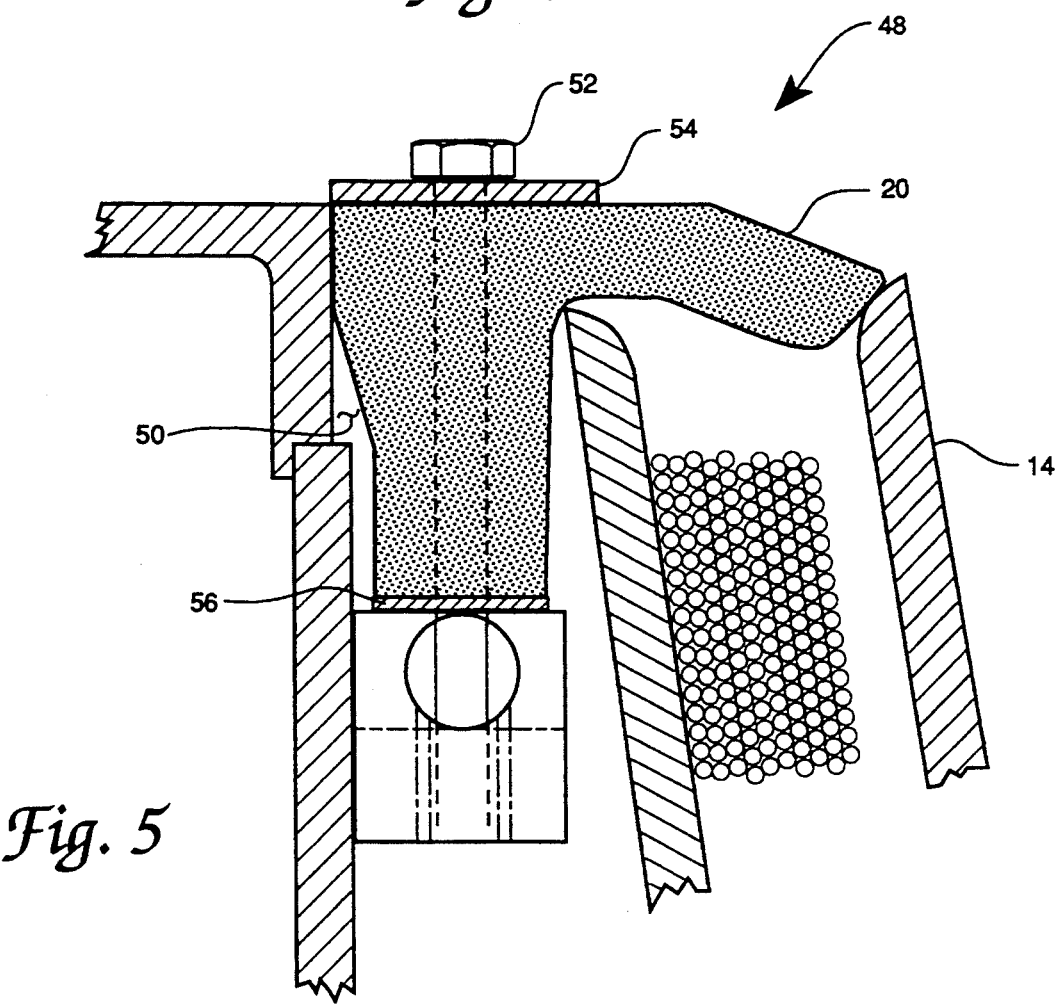

FIG. 5 is a partial cross-sectional view of one side of a weapon-mounted cover assembly 48. Cover 20 has an annular shape because the pre-existing housing for rf circuitry is already enclosed. The spool for weapon-mounted payout canister 14 fits into an available annular space 50. Cover 20 for the weapon-mounted payout canister uses three bolts 52 and three corresponding reefing line cutters (not shown in this view). One or more compression springs (also not shown in this view) are used to eject cover 20 away from payout canister 14 when the reefing line cutters are actuated. Generally, three compression springs will be used to apply a symmetrical force to cover 20 so that the cover ejects more smoothly. Annular segment shaped reinforcing washers 54 and 56 protect cover 20 from crushing when bolts 52 are tightened.

In tests using the described apparatus, the covers cleanly separated and ejected into the air stream with no harmful debris and without damage to the optical fiber or to the aircraft.

In use with a GBU-15 glide weapon, cover 10 was made of 8 to 10 lb/ft$^3$ density molded polyurethane rigid foam. Cover 10 was 7.625 inches in diameter and 0.50 inch thick. Its beveled lip or edge was beveled at 30°. Nylon bolt 26 was a 3/16 inch bolt.

The disclosed ejectable, lightweight foam cover assembly successfully demonstrates the use of plastic bolts that can be severed by conventional parachute reefing line cutters. Although the disclosed apparatus is specialized, its teachings will find application in other areas where rapid deployment of mechanisms are required.

It is understood that various modifications to the invention as described may be made, as might occur to one with skill in the field of the invention, within the scope of the claims. Therefore, all embodiments contemplated have not been shown in complete detail. Other embodiments may be developed without departing from the spirit of the invention or from the scope of the claims.

I claim:

1. A cover assembly for an optical fiber dispensing system having a fiber optic payout canister for holding a spool of optical fiber, comprising:
   (a) a plastic foam cover;
   (b) one or more plastic bolts for bolting the plastic foam cover to the payout canister;
   (c) one or more compression springs mounted between the plastic foam cover and the inside of the payout canister for resiliently biasing the plastic foam cover away from the payout canister; and,
   (d) a number equal to the number of plastic bolts of explosively fired means for severing bolts.

2. The cover assembly according to claim 1, wherein the plastic foam cover is frangible.

3. The cover assembly according to claim 1, wherein the plastic foam cover has a beveled lip for additional stiffness.

4. The cover assembly according to claim 1, wherein the plastic foam cover is a circular disk and the number of plastic bolts is one.

5. The cover assembly according to claim 4, further comprising one or more plastic washers positioned adjacent to the plastic foam cover.

6. The cover assembly according to claim 1, wherein the explosively fired means for severing bolts comprise an explosive parachute reefing line cutter.

7. The cover assembly according to claim 1, wherein the plastic foam cover is an annulus and the number of plastic bolts is three or more.

8. The cover assembly according to claim 1, wherein the plastic foam cover is made of molded polyurethane and the bolt is made of nylon.

* * * * *